July 16, 1940.  O. GOEKE  2,208,418

APPARATUS FOR THE SMELTING OUT OF ZINC FROM DUSTS CONTAINING METALLIC ZINC

Filed May 18, 1939

Inventor:
OTTO GOEKE
By
Attorney

Patented July 16, 1940

2,208,418

UNITED STATES PATENT OFFICE 2,208,418

APPARATUS FOR THE SMELTING OUT OF ZINC FROM DUSTS CONTAINING METALLIC ZINC

Otto Goeke, Wissen, Sieg, Germany, assignor to Hüttenwerke Siegerland Aktiengesellschaft, Siegen, Germany Application May 18, 1939, Serial No. 274,342
In Germany June 22, 1938

1 Claim. (Cl. 266—18)

When smelting ores, calcined pyrites and slags containing zinc in the blast furnace, dry dust containing more than 4% metallic zinc settles in the dust separating devices (dust pockets, agitators and gas flues).

Owing to the extraordinary degree of fineness and the low loose weight (weight per litre 0.5 to 1.25 kg.) this dust is, however, unsuitable without separate further treatment (roasting, dechlorination and the like) for the usual zinc recovering processes. The expenditure for the preliminary treatment is, however, very high so that profitable treatment of such dusts was hitherto questionable.

It was very obvious, to smelt out the metallic zinc content from the dust according to the known process in an externally heated rotary drum, whose inner wall is kept at a temperature slightly above the melting point of the zinc.

However, it was found that a melting out or coalescing of the metal did not take place. This is probably due to the extremely small grain size, which results in the dust floating in the drum, that is it does not participate in the rotary movement of the drum. Furthermore, it may be assumed that, owing to the zinc oxides and other admixtures still contained in these dusts, the very small zinc metal particles are enveloped by a thicker zinc oxide film than is the case with zinc dust which is treated in the zinc smelting works.

It has already been proposed, to exert pressure on the charge in the drum and to use a cylinder for this purpose. This cylinder is mounted in the stationary drum and has a mechanical drive. The smelting out of zinc in such drums, however, possesses objections. A serious objection is the lack of reliability of the arrangement, because it is difficult to prevent the zinc from depositing on the bearings of the cylinder. Another objection is, that the exchanging of the cylinder, in the event of it becoming damaged or unfit for use, presents difficulties. Finally, it is difficult to keep the bearings sufficiently tight.

These objections are overcome by the invention which is characterized in that the cylinder exerts a pressure on the charge merely by the action of gravity and has no mechanical drive of the cylinder, but also all bearings for the cylinder are rendered unnecessary by the invention. A great advantage of the improvement according to the invention is that it is easily possible, to exchange one cylinder for another so that it is easy to adapt the treatment to the actual properties of the dust to be treated in the drum by using a cylinder of heavier weight or larger diameter.

The invention enables with a very simple apparatus the smelting out of zinc from dusts containing metallic zinc, this having been hitherto uneconomical or impossible on account of the low loose weight and the very small grain size.

An embodiment of the invention is illustrated by way of example in the accompanying drawing, in which.

Figure 1:
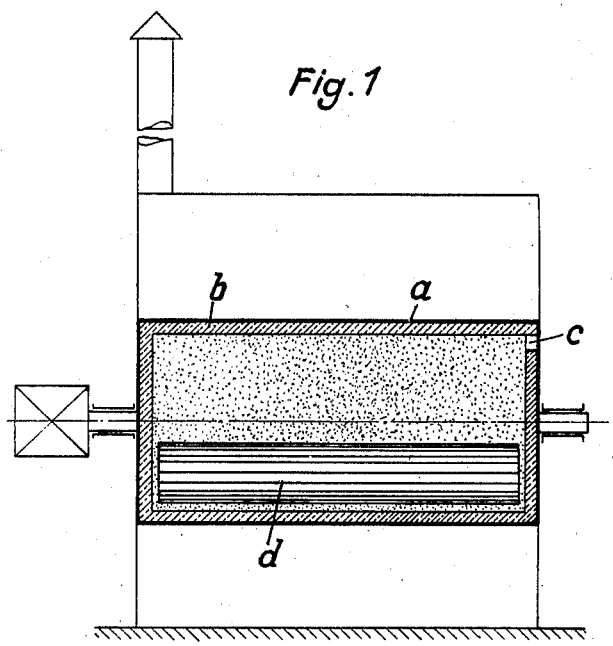
Fig. 1 shows the apparatus in longitudinal section.
Figure 2:
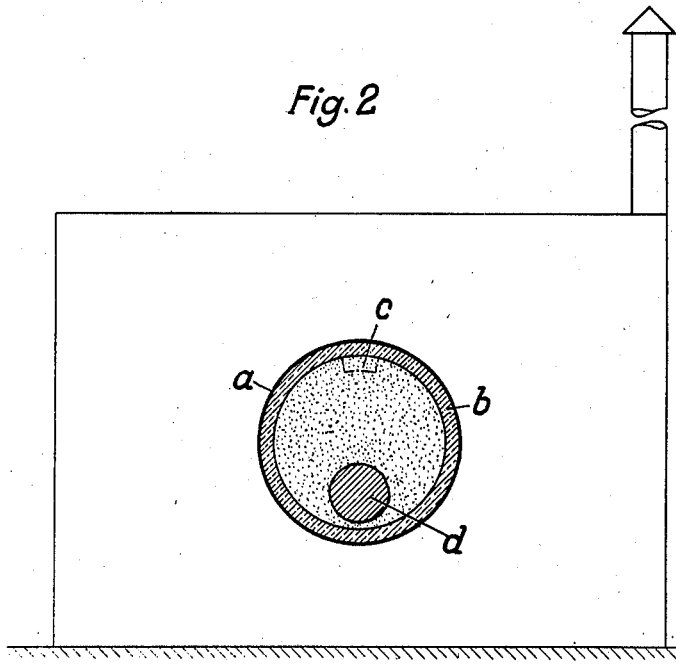
Fig. 2 is a cross-section of Fig. 1.

A rotary drum $a$ has a refractory lining $b$ and a closable filling discharging aperture $c$ in one of its end walls. It also accommodates a steel cylinder $d$ for working the dust, which cylinder may be fluted or roughened and of a length corresponding approximately to the internal length of the drum. The drum is supported in a casing accommodating the firing. The drum is heated in known manner so that the inner wall of the drum is maintained at a temperature slightly higher than the melting point of the zinc.

I claim:

Apparatus for smelting out zinc from dust containing zinc and having a very low loose weight and small size of grain, comprising in combination a rotary drum adapted for heating to maintain its inner surface at a temperature slightly higher than the melting point of zinc, and a single cylindrical member unattached to and resting loosely within the drum to contact the bottom thereof substantially along its length for exerting pressure on the charge solely by the action of gravity and expedite melting thereof.

OTTO GOEKE.